(12) United States Patent
Bijou

(10) Patent No.: US 8,725,058 B2
(45) Date of Patent: May 13, 2014

(54) SALES RESPONSE TRAINING SYSTEM AND METHODS

(75) Inventor: Christopher Bijou, Draper, UT (US)

(73) Assignee: Ideal Response, Inc., Draper, UT (US)

( * ) Notice: Subject to any disclaimer, the term of this patent is extended or adjusted under 35 U.S.C. 154(b) by 937 days.

(21) Appl. No.: 12/548,332

(22) Filed: Aug. 26, 2009

(65) Prior Publication Data

US 2010/0099060 A1    Apr. 22, 2010

Related U.S. Application Data

(60) Provisional application No. 61/091,943, filed on Aug. 26, 2008.

(51) Int. Cl.
*G09B 3/00* (2006.01)
(52) U.S. Cl.
USPC ............................... 434/350; 434/219
(58) Field of Classification Search
USPC ................... 434/322, 323, 350, 365, 362
See application file for complete search history.

(56) References Cited

U.S. PATENT DOCUMENTS

| | | | | |
|---|---|---|---|---|
| 5,878,214 | A | * | 3/1999 | Gilliam et al. ............... 709/204 |
| 6,029,043 | A | * | 2/2000 | Ho et al. ...................... 434/350 |
| 2006/0173732 | A1 | * | 8/2006 | Edwards ........................ 705/12 |
| 2007/0156421 | A1 | * | 7/2007 | Klapper .......................... 705/1 |
| 2011/0136094 | A1 | * | 6/2011 | Weiler ......................... 434/362 |

\* cited by examiner

*Primary Examiner* — Peter Egloff
(74) *Attorney, Agent, or Firm* — Maschoff Brennan

(57) ABSTRACT

Embodiments of the invention describe the implementation and execution of situational response training (SRT). In some embodiments, a sales team can use an SRT to implement real-time, peer-reviewed and/or focused training. For example, a manager can prepare a training situation through a web interface and then verbally record the training through a telephone interface. The training situation can include any number of questions, scenarios, fact patterns, etc. that can require a response by members of the sales team. Once prepared, the manager can send the training situation to his sales team. The sales team can then prepare and respond to the training situation over the phone using an interactive voice response (IVR) system or through another communication channel. For example, the training situation can be sent via email requesting that each member of the sales team respond to the training situation through a telephone interface.

8 Claims, 22 Drawing Sheets

Dashboard | My Teams | My Situations | My Training Dates | My Players

No Active Team
Change Active Team ▶

My Situations
New Situation
Main Settings

Edit Intro Prompt 1
Edit Intro Prompt 2
Edit Intro Prompt 3

Edit Question 1

Edit Open Question 1
Edit Open Question 2

Custom Prompts
Record this Situation

Open Response Question Setup

Please fill in the text for the question below.

Open End Question Text

You are with a customer. They are comparing SalesForce.com to RightNow Technologies. They look at the pricing proposal. How would you answer this objection.

What, this is way more than RightNow is charging...

Correct Answer Text

Interesting. I'm always interested in what others charge for their products. We are a premium product. RightNow is a good product. But, as you get deeper and deeper in our system and your 400 users have to use it every day, there are some huge differences.

Many aren't apparent on a checklist until you actually have to use the system. Before we get into some of the speed and product differences. Are you working from a defined budget? is that part of your criteria?

Submit

Email Introduction Send Date (m/d/YYYY)
08/21/2009

Email Invitations Date (m/d/YYYY)
08/24/2009

Outbound Calls Start Date (m/d/YYYY)
08/25/2009

End Date (m/d/YYYY)
08/26/2009

Outbound Calls Start Time (HH:mm)
08:00:00

Outbound Calls End Time (HH:mm)
11:00:00

Default Timezone
America/Denver

Manager(s) will review and rank responses
☑

Peers will review and rank responses
☑

Expert(s) will review and rank responses
☑

Start Training

| | MONDAY | | | | |
|---|---|---|---|---|---|
| 24 | Aug 2009 | | | | |
| TIME: | | | | | |
| 1 | 1:00 | Call backs | | | |
| 2 | 2:00 | Turn in Patents | | | |
| 3 | 0:30 | Email clients | | | |
| 4 | 1:00 | Learn new module | | | |
| 5 | 1:30 | Practice for demo | | | |
| 6 | | | | | |
| 7 | | | | | |
| 8 | | | | | |
| 9 | | | | | |
| 10 | | | | | |

| BUSINESS HOURS EVENTS | Time (6:00) | S | RATE TO IMPROVE: | | Time/Date |
|---|---|---|---|---|---|
| 1 | Call backs | 1:00 | 3 | 1 | |
| 2 | Email clients | 0:30 | 3 | 2 | |
| 3 | Practice for demo | 1:30 | 2 | 3 | |
| 4 | Turn in Patents | 2:00 | 1 | | |
| 5 | Learn new module | 1:00 | 1 | | |

| NON-BUSINESS HOURS EVENTS | | | | | Time/Date |
|---|---|---|---|---|---|
| 6 | | | | 1 | |
| 7 | | | | 2 | |
| 8 | | | | 3 | |
| | | | | 4 | |

SALES RESPONSE TRAINING SYSTEM AND METHODS

CROSS-REFERENCES TO RELATED APPLICATIONS

This application is a non-provisional, and claims the benefit, of commonly assigned U.S. Provisional Patent Application No. 61/091,943, filed Aug. 26, 2008, entitled "Sales Response Training System and Methods," the entirety of which is herein incorporated by reference for all purposes.

BACKGROUND

Various sales training programs are available. Most training is conducted in a classroom or online. Some training is conducted in a role playing format that allows participants to practice sales or management approaches. One of the downsides of such training, is the lack of meaningful follow up.

BRIEF SUMMARY

Embodiments of the present invention include various aspects of situational response training. In one embodiment of the invention a manager can create a training situation that can include an open question, multiple choice question, or a fact pattern that can be presented to members of the manager's training group. In some embodiments, the manger can enter the training situation into a web interface as text. Once entered, the training situation can be converted into a narrative. The manager can then verbally record the narrative through a telephone interface. In some embodiments, the narrative can include choices for the manager to record different aspects of the narrative at different times and/or in response to specific prompts.

In some embodiments, when the training situation has been created, members of the managers group can be alerted to participate in the training situation. Members can call a telephone number or use a computer to receive the training material. The members can then provide responses to the questions presented or to the fact pattern. After a set period of time, or when a sufficient number of response have been gathered, the responses can be presented to the group, for example, through a web page. Group members can then rate and/or comment on different responses to the fact pattern.

BRIEF DESCRIPTION OF THE FIGURES

FIG. 13 is a screenshot of a multiple choice question SRT being entered into the system according to some embodiments.

FIG. 14 is a screenshot of a web interface that can be used to add agents to a group according to some embodiments.

FIG. 15 is a screenshot of an open ended question SRT being entered into the system according to some embodiments.

FIG. 17 is a screenshot of a web interface for preparing an SRT according to some embodiments.

FIG. 18 is a screen shot of a web interface for preparing the training dates according to some embodiments.

FIGS. 20-22 are screen shots of embodiments of the invention.

DETAILED DESCRIPTION

Figure 1:
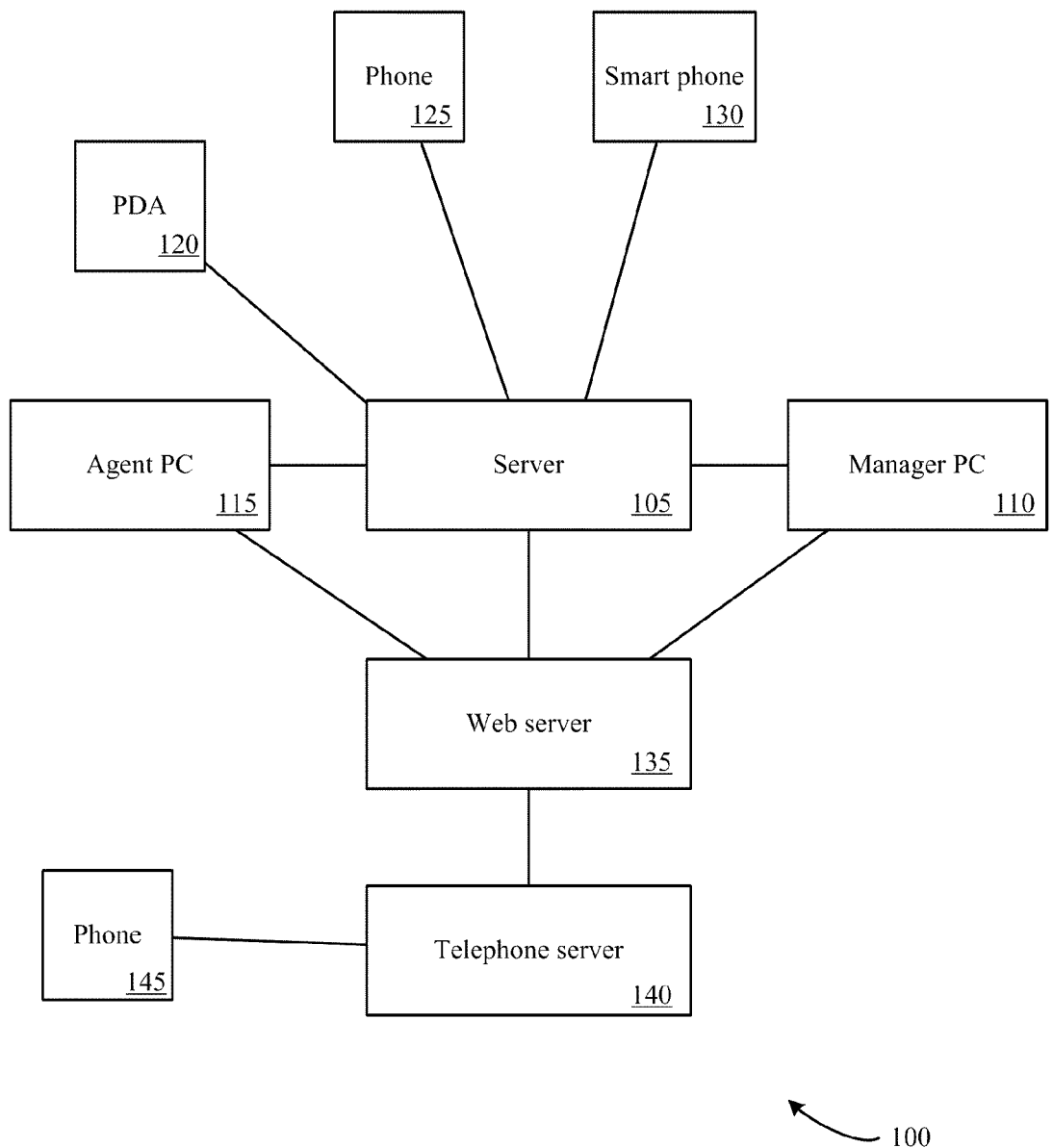
FIG. 1 shows a block diagram of a system for implementing various embodiments of the invention.

The ensuing description provides various embodiments of the invention only, and is not intended to limit the scope, applicability or configuration of the disclosure. Rather, the ensuing description of the embodiments will provide those skilled in the art with an enabling description for implementing an embodiment. It should be understood that various changes may be made in the function and arrangement of elements without departing from the spirit and scope as set forth in the appended claims.

Embodiments of the invention describe the implementation and execution of a situational response training (SRT). A sales team can use an SRT to implement real-time, peer-reviewed and/or focused training. For example, a manager can prepare a training situation through a web interface and then verbally record the training through a telephone interface. The training situation can include any number of questions, scenarios, fact patterns, etc. that can require a response by members of the sales team. Once prepared, the manager can send the training situation to his sales team. The sales team can then prepare and respond to the training situation over the phone using an interactive voice response (IVR) system or through another communication channel. For example, the training situation can be sent via email requesting that each member of the sales team respond to the training situation through a telephone interface.

Responses to training situations can be used in a number of ways. In some embodiments, the responses from all members can be collated and provided to the group for review and/or comment. From these responses members of the team can chose what they deem to be the best response and use the responses from other team members to improve their response. Group members can also provide feedback to these responses. The best responses, as voted on by the members of the group, can be collated and resent to the members of the group. From this list members can select the ideal response.

Thus, embodiments of the invention can provide interactive peer review situational training from which an ideal response can be gathered.

In some embodiments, responses to training situations can be tracked on an individual or group basis. From such data, an individual can be compared with peers in order to track the progress of the individual. Teams can be tracked to compare team progress or assess other training exercises. Such data can be uses to show progress by an individual with performance areas that require improvement. Such data can also be used to assess performance reviews for such things as raises, lay offs, promotions, terminations, etc.

Embodiments of the invention provide a mechanism whereby managers move away from accounting practices (e.g. determining performance based on achieved quotas) and become sales coaches by providing meaningful training situations. By using training situations teams and individuals can improve in various skill areas which can increase quotas without focusing on quotas. Moreover, embodiments of the invention can empower peers with a voice in reviewing training situations. Areas of improvement can be identified for agents that develop no or poor responses to training situations.

Other embodiments of the invention include a calendaring system that can auto populate a calendar with a prioritized list of tasks. A prioritized task list can be created that includes various tasks chosen by a user according to the priority of the task. Once created the prioritized task list can be used to auto calendar time to work on a task in an electronic calendaring system. In some embodiments, the calendaring system can include methods for prioritizing and methods for auto populating a calendar.

FIG. 1 is a block diagram of a system 100 for implementing various embodiments of the invention. In some embodiments, server 105 can be communicatively coupled with agent PC 115, personal digital assistant (PDA) 120, phone 125, and/or smart phone 130. Server 105 can also be coupled with web server 135 and/or manager computer 110. Server 105 can include any type of computing device or server and can communicate with devices through one or more networks, such as the Internet, mobile telephone networks, and/or switched telephone networks. Similarly, manager PC 110 and agent PC 115 can include any type of computer. Web server 135 can be coupled with telephone server 140 which can be communicatively coupled with phone 145. Telephone server 140 can be an Interactive Voice Response (IVR) server and can interface with mobile as well as wired phones.

Figure 2:
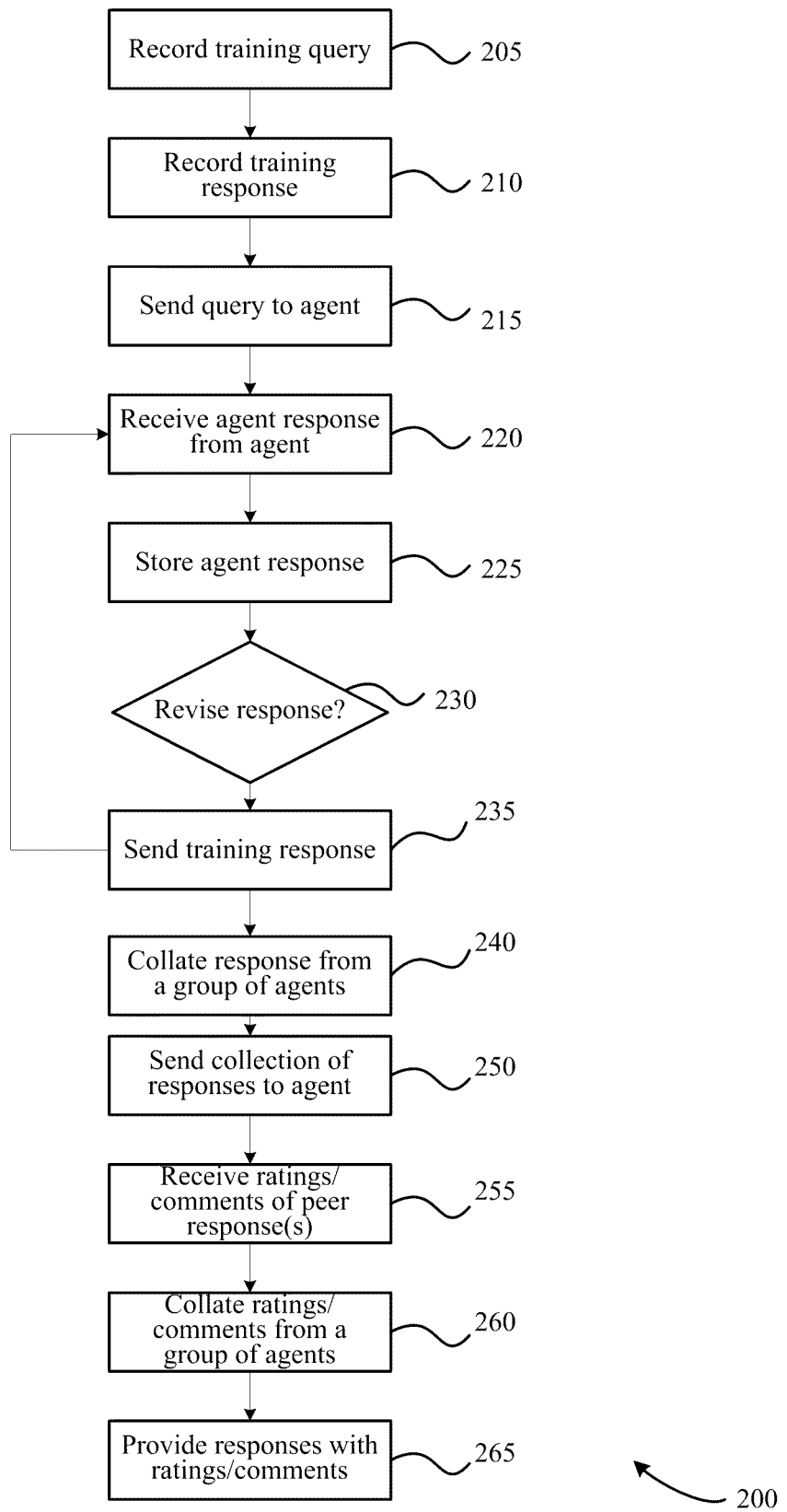
FIG. 2 shows a flowchart of a method for creating and/or executing an SRT according to some embodiments of the invention.

FIG. 2 is a flowchart of method 200 for creating and/or executing an SRT according to some embodiments of the invention. Method 200 starts at block 205. At block 210 a training query can be recorded. A training query can include any type of question such as an open ended question, a true or false question and/or a multiple choice question. The training, for example, can include situations shown in FIG. 4 as well as any other type of simulation or training exercise. The training query can be recorded at block 210 at a personal computer (e.g. manager PC 110) using an application or a web interface, over the phone using an IVR, or using a smart phone or personal digital device (e.g. using a web interface or an application). In some embodiments, after the training query has been recorded, a manager's response can be recorded at block 210. In other embodiments, multiple manger responses can be recorded.

Figure 5:
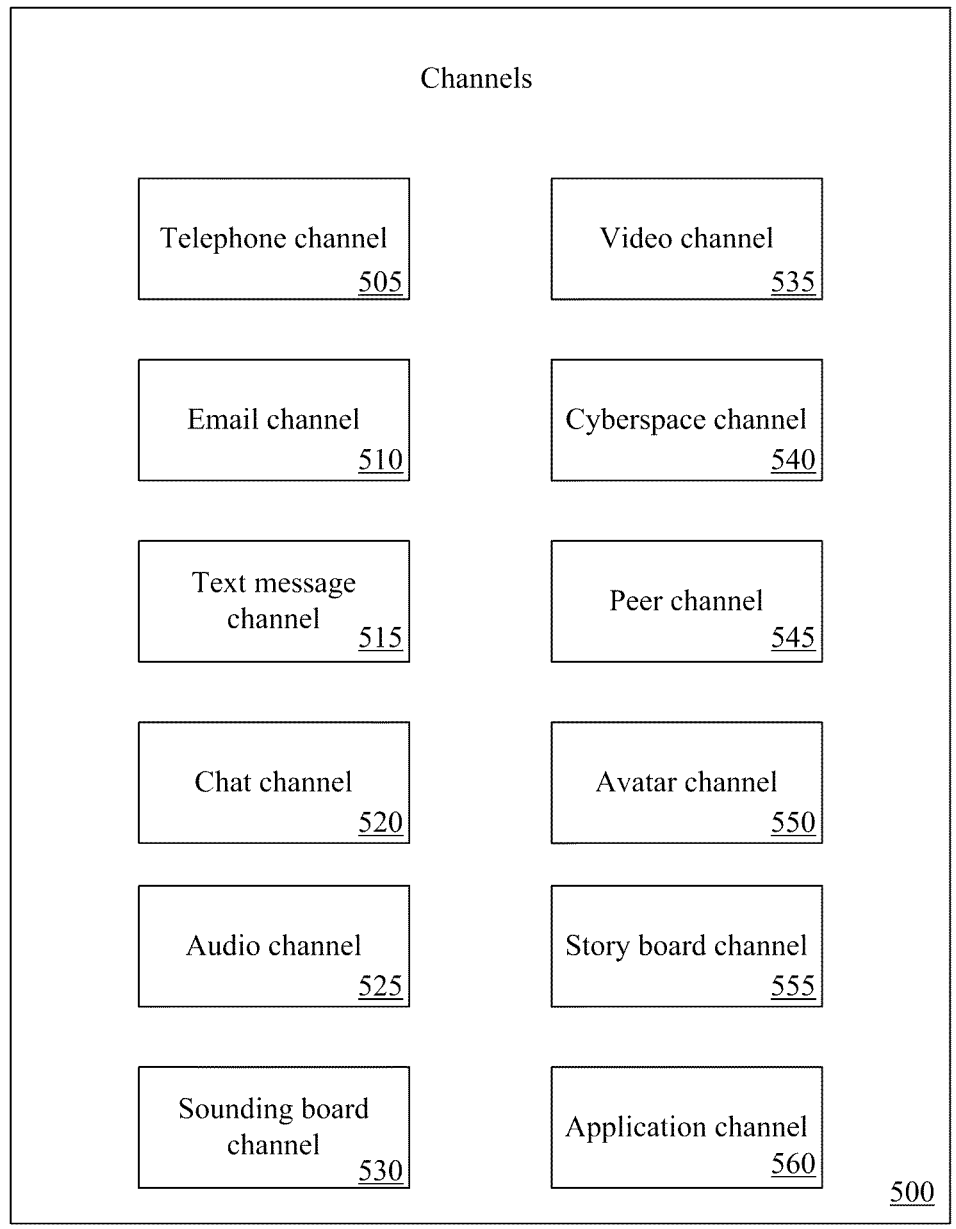
FIG. 5 includes a chart showing the various channels that can be used by an SRT to provide training.

At block 215 the training query can be sent to agents within a predefined agent group or subgroup. The agent group can include any type of group of agents such as a sales team, mentors, trainees, students, an individual, or an entire organization, etc. The training query can be sent to the agents using any type of communication scheme such as, an email, chat, voicemail, telephone call, twitter feed, etc. Other channels can be used as shown in FIG. 5. In some embodiments, multiple channels can be implemented. In some embodiments, the training query can be sent to the agents on a predefined schedule.

At block 220 each individual agent can respond to the training query. The response can be recorded as audio, a text message, an email, etc. The response can be stored at block 225. At block 230 the agent can choose to revise his response as desired. In doing so, the agent can have the opportunity to play back the previously recorded response and then chose if the response is acceptable or not. If the agent chooses to revise the recorded message method 200 returns to block 220. Otherwise method 200 moves on and the training response is sent to the server at block 235.

At block 240 responses from all the agents within a group can be collated for the specific training query. At block 250 these response can then can be sent to each agent in the group or presented on a webpage. The agent can then vote on the best response(s) from the collated training responses. Ratings and/or comments on training responses can be received at block 255. At block 260 these ratings/comments can be collated and the responses can be resent to the agents along with the comments at block 265. Thus, according to this embodiment each agent can learn different responses to the training query from peers within the group. Various modifications, additions, and/or steps can be added to method 200. Moreover, in some embodiments time can elapse between some of the steps. In other embodiments, blocks can be combined or rearrange in any combination.

Figure 3:
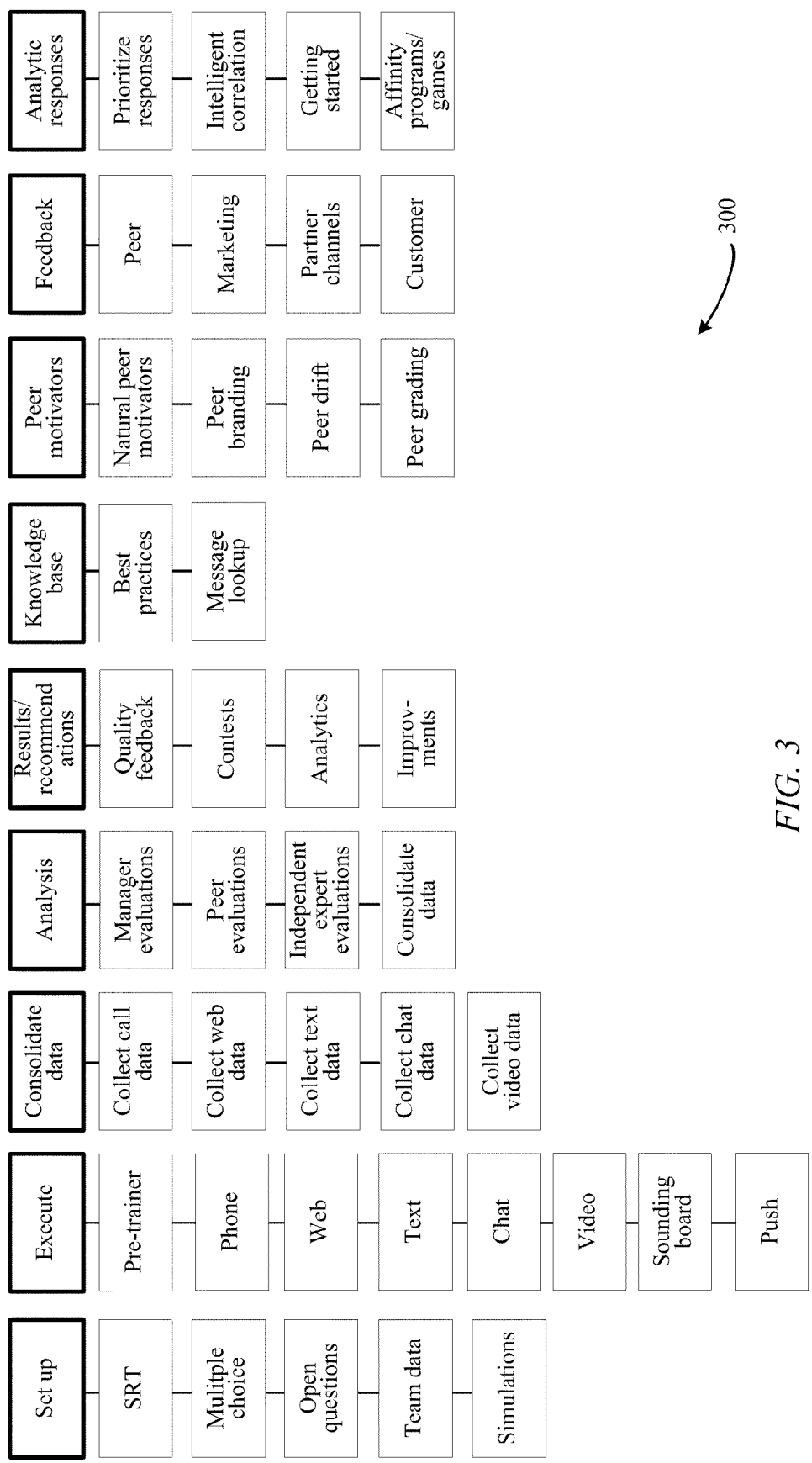
FIG. 3 is a chart listing examples of various components of an SRT system according to some embodiments.

FIG. 3 is a chart 300 listing examples of various components of an SRT system according to some embodiments. These components can include different ways to set up and execute an SRT. Different types of data collation, analysis and/or recommendations from the data collected from an SRT are also described. Various other SRT components are described. This chart is by no means inclusive or conclusive. Other components can be implemented.

Figure 4:
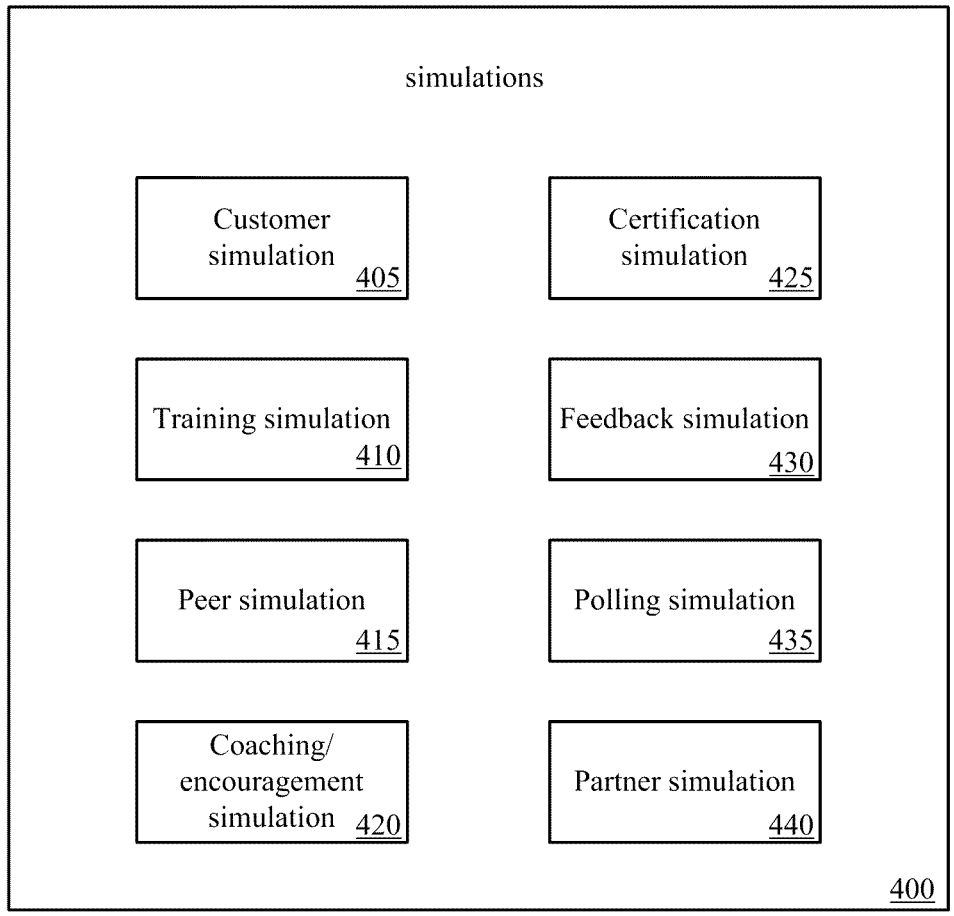
FIG. 4 shows a chart of different types of SRTs according to some embodiments.

FIG. 4 shows chart 400 showing different types of SRTs according to some embodiments. This listing of SRTs is not inclusive or conclusive. SRTs can include customer implemented or customer specific simulations 405. Customer simulations can include video, audio, emails, voicemails, phone conversations, and personal experiences with a specific or general customer. An SRT can also include training simulations 410 that can be built using training materials, company procedures, best practices, user manuals, product manuals, videos, emails, voicemails, phone conversations. Peer simulations 415 can also be included and can include information from peer emails, texts, phone conversations, voicemails, etc. Coaching and encouragement simulations 420 can also be built. These can be created from positive comments from family, friends, and/or peers. These simulations can also provide motivation for the accomplishment of goals.

Certification simulations 425 can also be included. Certification simulations can be developed from certification materials. These simulations can be used to aide in passing a certification test and/or to determine if an agent has maintained certification knowledge. Results from such simulations can be used to provide feedback on certification requirements to the agent, manager, officiators, etc.

Feedback simulations 430 can be created using external information that can be used to show current market trends, etc. Polling simulations 435 can be created to poll or request and disseminate votes on issues and/or ideas. Partner simulations 440 can be used to simulate ideas and concepts from partners.

FIG. 5 includes chart 500 showing the various channels that can be used by an SRT to provide training. These channels can include telephone 505, email 510, text messages 515, chat 520, audio 525, sounding boards 530, video 535, cyberspace 540, peers 545, avatars 550, story boards 555, and/or applications 560. SRTs can sent training situations to agents and receive responses from agents using channels that can include any of the above.

Figure 6:
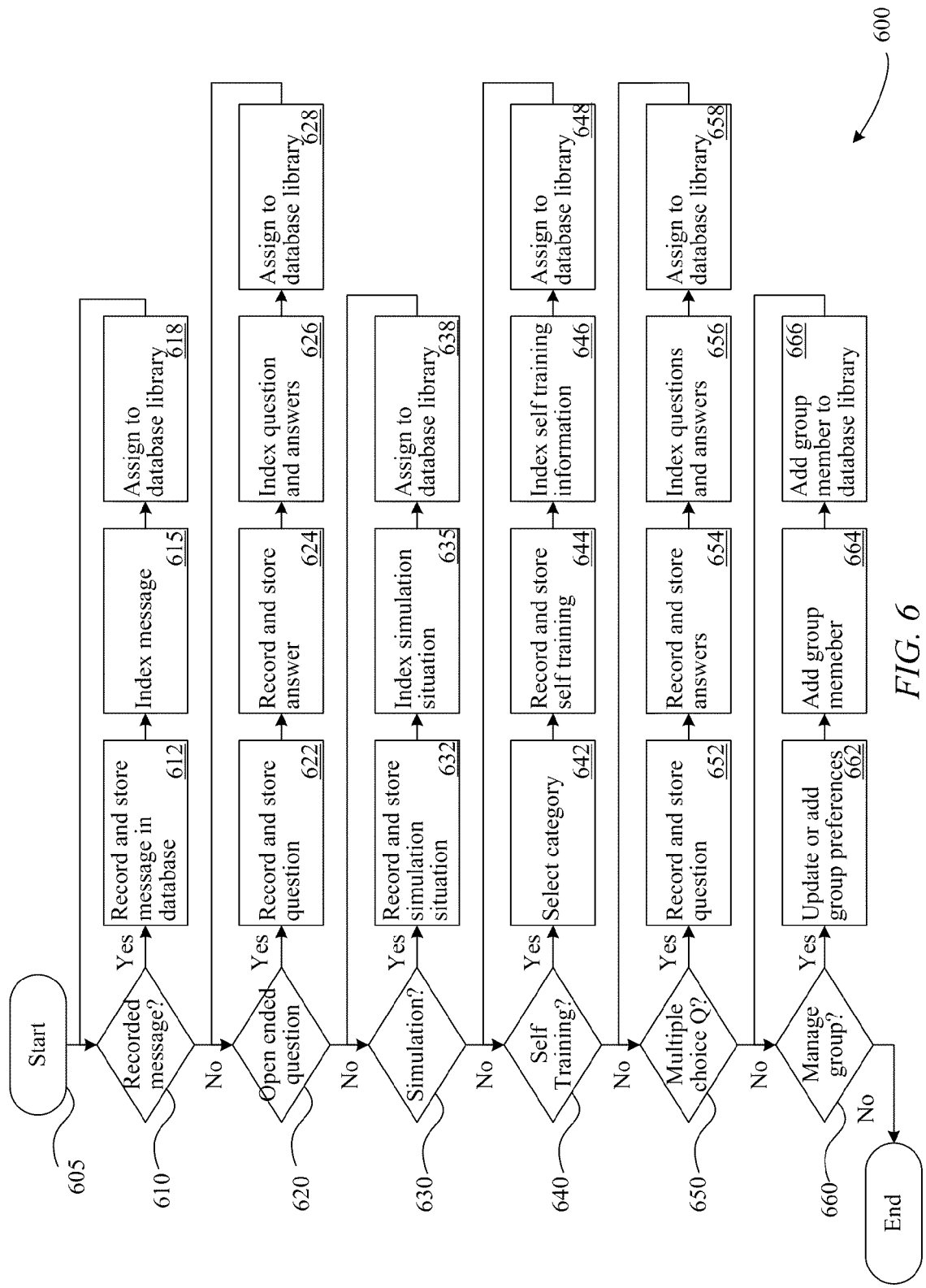
FIG. 6 is a flowchart depicting a method for setting up portions of an SRT according to some embodiments

FIG. 6 is a flowchart depicting method 600 for setting up portions of an SRT according to some embodiments. Method 600 starts at block 605. Method 600 can allow a user to create a number of different types of SRTs. The user can create a single SRT and/or multiple SRTs of the same or different type. At block 610 the user (e.g. a manager) can choose a situational response that includes a recorded message. The message can be recorded and stored in a database at block 612. For example, an agent can present the recorded message through a telephone and/or through a PC. For example, the recorded message can be recorded through any channel shown in FIG. 5. The recorded message, for example, can be saved at a local PC or at a server. At block 615 the message can be indexed and at block 618 the message is assigned to a library. As another example, the user can download a prerecorded message from a web server.

At block 620 the user can choose to develop an SRT with an open ended question. The question can be recorded and/or entered and stored at block 622 and an answer can be recorded and/or entered at block 624. In some embodiments, an open ended question may or may not include an answer. For example, the question and/or answer can be recorded and/or entered through any channel shown in FIG. 5. The question and/or answers, for example, can be entered at a local PC or at a server. At block 626 the question and/or answers can be indexed and at block 628 the question and/or answers can be assigned to a library. FIG. 15 shows a screen shot of a user entering an open ended question into a web interface according to one embodiment. In some embodiments, after entering the open ended question and/or providing a sample response through the web interface, the manager can then record an audio version of the question and answers.

A simulation training can be used in an SRT at block 630. The simulation can include a fact pattern, a role play, a simulated sales approach or pitch, etc. The simulation can be recorded and stored at block 632, for example, through a phone or through a web interface. For example, the simulation can be recorded through any channel shown in FIG. 5. The simulation, for example, can be saved at a local PC or at a server. The simulation can be entered as an audio source or as text. The simulation can be received through a web server or through a phone call.

At block 640 a self training SRT can be created. A self training SRT can include training in a number of categories. At block 642 the user select a self training category and at block 644 a self training situation can be recorded and stored. For example, the self training situation can be recorded through any channel shown in FIG. 5. The self training, for example, can be saved at a local PC or at a server. The training situation can be indexed at block 646 and assigned to a library at block 648.

Figure 13:
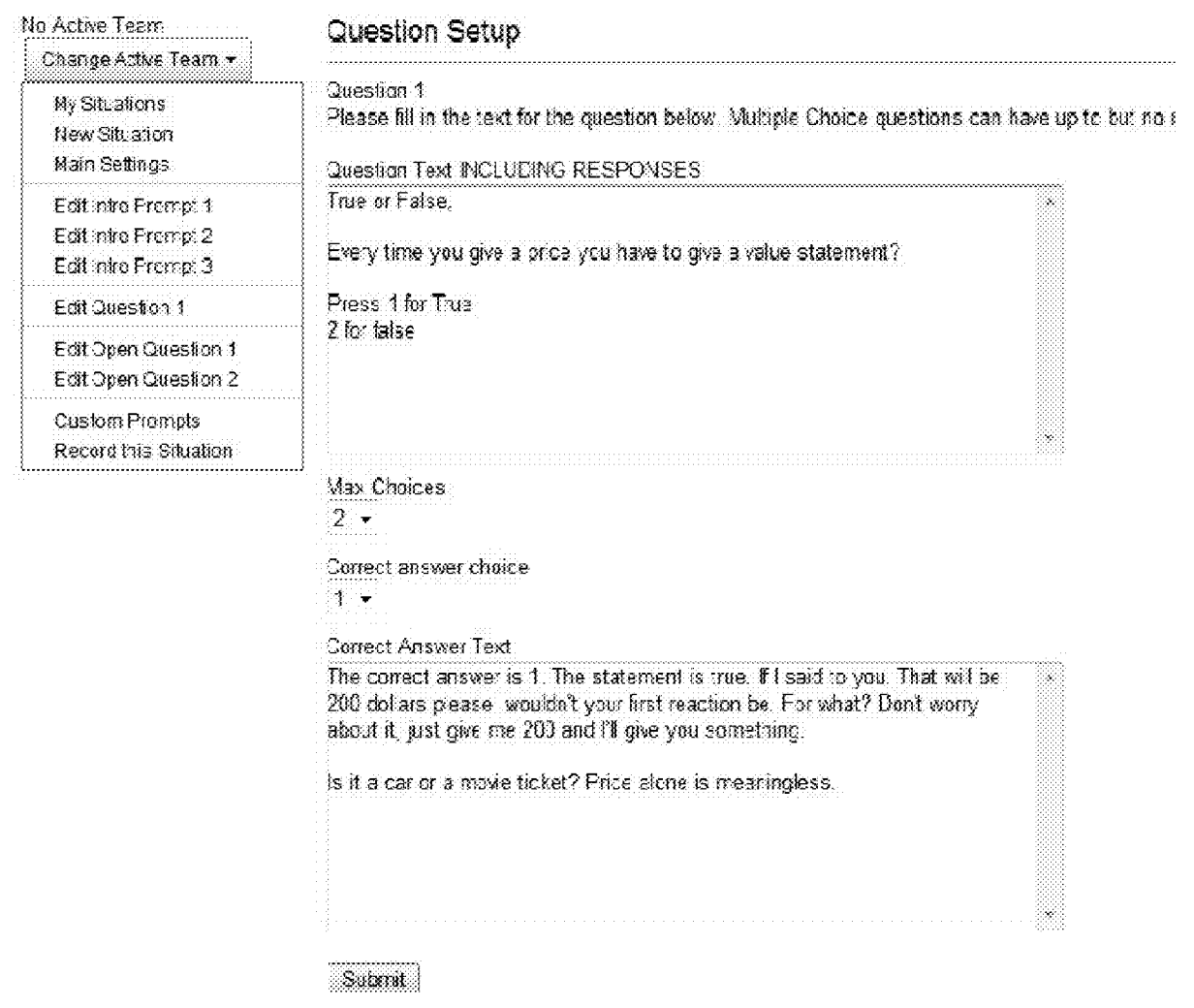

At block 650 a multiple choice training question can be entered in to the SRT. The questions and answers can be recorded and stored at block 652 and block 654. For example, a manager can enter the multiple choice question and the right and wrong answers through a web interface on a personal computer. The information can be sent from the web interface to a central server. The answers can be indexed and assigned to a database library at blocks 656 and 658. FIG. 13 shows a screen shot of a user entering a multiple choice question into a web interface according to one embodiment. In this example, the multiple choice question is a true/false question. A user can select any number of possible answers.

Figure 14:
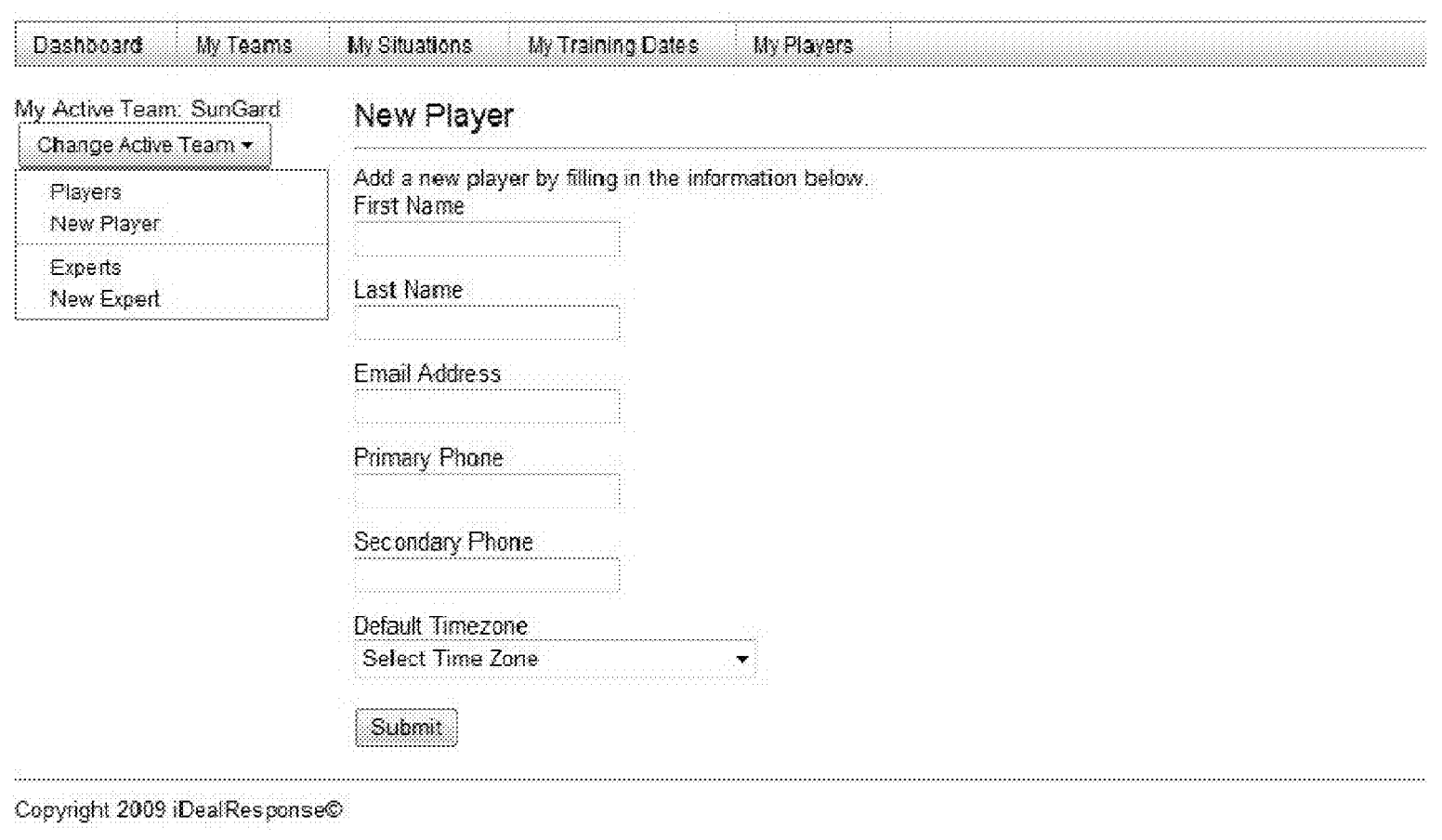

At block 660 the user can manage the group. The group includes those individuals that will receive and participate in SRTs. At block 662 group preferences can be created and/or edited. Preferences can include, for example, SRT delivery methods, response time, the period between SRTs, feedback preferences, etc. At block 664 members can be added to the group or deleted from the group. Member information can include the members phone number, email address, preferences for SRT delivery, etc. FIG. 14 shows an example screen shot that can be used to enter a new group member (player).

Various other group management and/or SRT development processes and/or steps can be included within method 700 without limitation.

Figure 7:
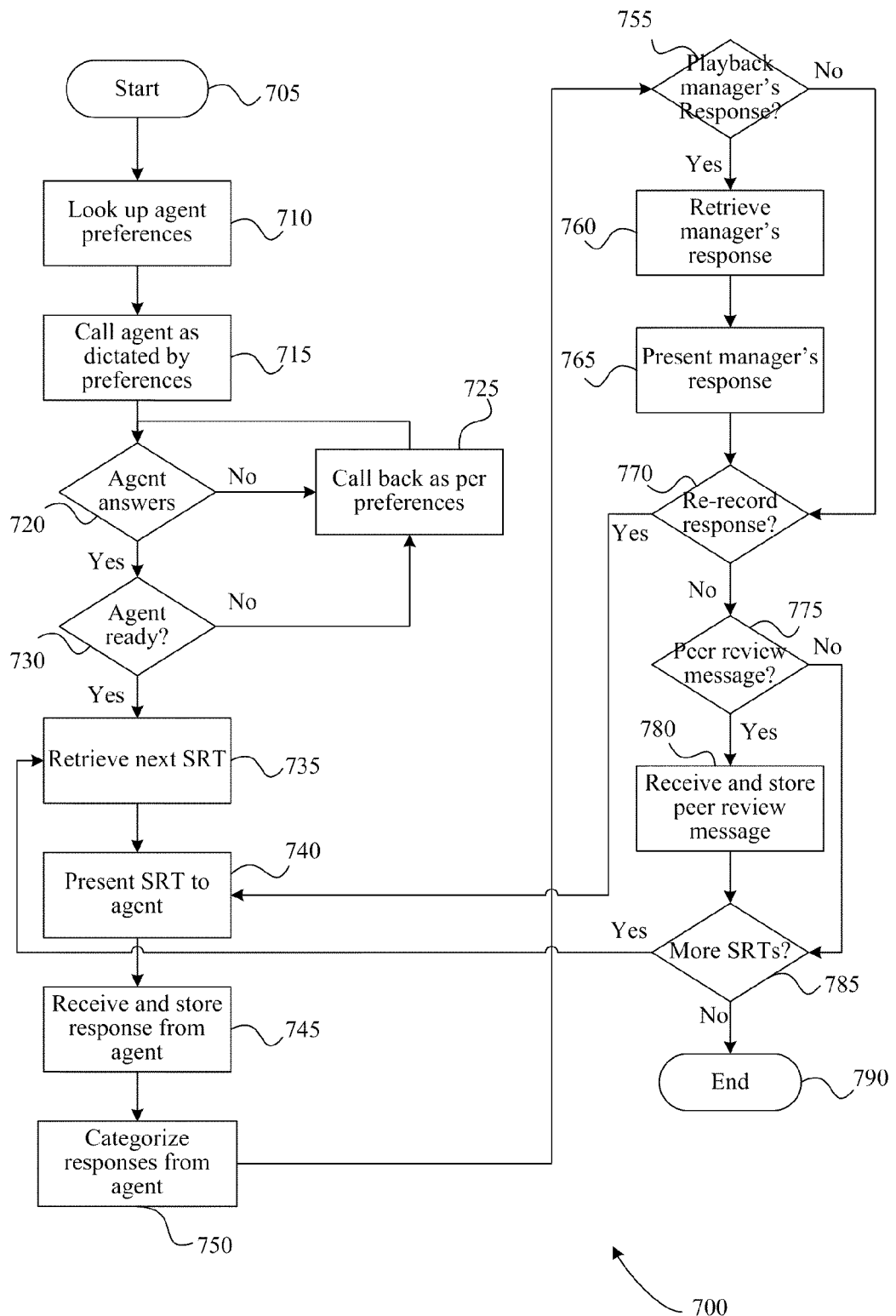
FIG. 7 is a flowchart of a process for executing an SRT according to some embodiments of the invention.

FIG. 7 is a flowchart of process 700 for executing an SRT according to some embodiments of the invention. Process 700 focuses on the delivery and response to an agent within a group. Process 700 can be adapted to deliver SRTs and receive response to SRTs for a group. Process 700 can execute at any computing device or server, for example, server 105 shown in FIG. 1. Process 700 can also be implemented in program code and/or software for execution at a computer and/or server.

Process 700 starts at block 705. At block 710 the preferences for the agent (e.g. member of a group) can be looked up. The preferences can be stored in a database, for example, any a server or servers. The preferences can include group or individual preferences. At block 715 the agent is contacted with an automated phone call as directed by the agent's preferences. The preferences, for example, can dictate the time the phone call is initiated and the communication channel used (e.g. email, phone, text, etc. and can include contact information).

At block 720, if the agent does not answer the phone call, then the agent can be called back at block 725 as dictated by the agent's preferences. For example, the preferences can indicate the period of time process 700 should wait prior to calling the agent back. The preference may also indicate how to respond if the agent fails to answer a call after a set number of attempts.

At block 730 it can be determined if the agent is ready to proceed with an SRT. For example, the automated phone call can query the agent to determine whether the agent is ready to proceed. For example, the automated phone call can ask whether the agent is ready to proceed or not. In response, the agent can select a numeric keypad. If they are not ready to proceed, process 700 returns to block 725. If the agent is ready, process 700 can move on to block 735.

At block 735 the next SRT for the agent (or agent's group) can be retrieved from memory and presented to the agent through the phone (or other channel) at block 740. In response to the SRT, the agent can provide a response through the phone (or other channel) at block 745. The response can be stored in a database along with responses from other agents responding to the same SRT. At block 750, the various response from the agents can be organized, categorized and/or collated.

At block 755 process 700 can ask the agent whether the agent would like to view and/or listen to the manager's response to the SRT. If the agent responds in the affirmative, then the manager's response is retrieved from memory at block 760 and presented to the agent at block 765. At block 770 the agent can be asked whether they'd like to rerecord the previous response. If the answer is affirmative, process 700 can proceed to block 740. At block 775 process 700 can ask the agent if they'd like to store a message that is included with the peer review. If so, the peer review message can be received and stored through the phone at block 780.

At block 790 it is determined whether there is one or more SRT remaining to present to the agent. If so, process 700 moves to block 735. Otherwise, process 700 ends at block 790.

While process 700 describes delivery of an SRT any type of delivery channel can be used. For instance, process 700 can be used to deliver SRTs using any channel shown in FIG. 5 without limitation. Moreover, process 700 can include other blocks, steps, and/or processes. Moreover, the various blocks shown in process 700 can be performed in any order.

Figure 8:
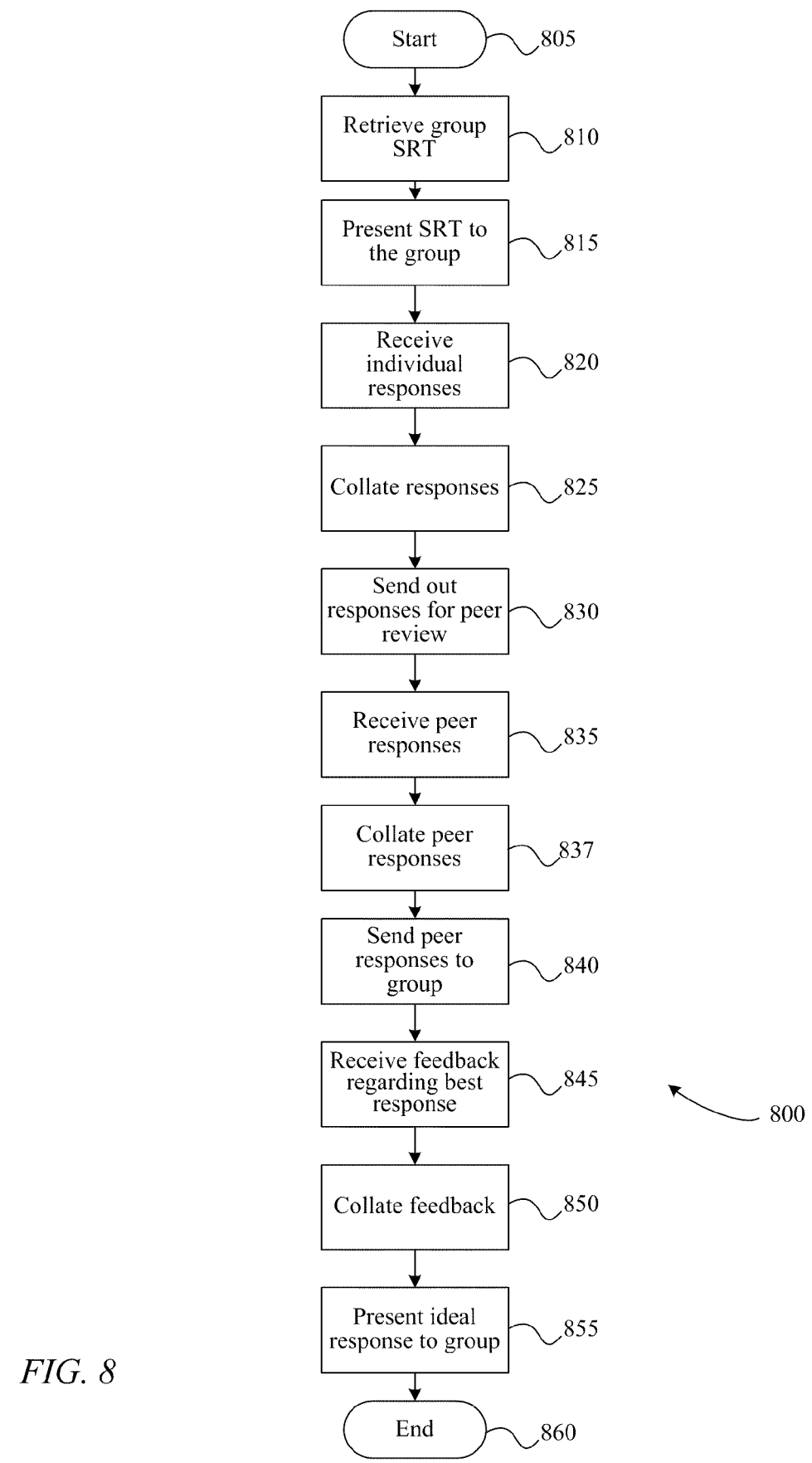
FIG. 8 is a flowchart of another process for executing an SRT according to some embodiments.

FIG. 8 is a flowchart of process 800 that can be used for executing an SRT according to some embodiments. Process 800 can be adapted to deliver SRTs and receive response to SRTs for a group. Process 800 can execute at any computing device or server, for example, server 105 shown in FIG. 1. Process 800 can also be implemented in program code and/or software for execution at a computer and/or server.

Process 800 begins at block 805. At block 810, a previously created and stored SRT can be retrieved from memory. The SRT can be created using any process, for example, process 600. At block 815, the SRT can be presented to the agents (e.g. members) of the group. The SRT can be presented using any combination of channels and can include those channels shown in FIG. 5. In some embodiments, an SRTs can be developed to execute using a single channel or multiple channels. A telephone channel, for example, using an IVR system can also be utilized for the SRT.

At block 820 responses can be retrieved from the agents within the group. Process 800 can remain at block 820 until a preset time period expires and/or until a set number of responses have been retrieved. Responses can be received from any number of channels. Responses can be saved and/or stored in a database upon receipt. In some embodiments, responses can be saved with an identifier associating the responses with an SRT. At block 825 the responses can be collated and organized in memory such that responses associated with an SRT are associated together.

At block 830 responses are sent out to the agents within the group for peer review. The responses can be sent to the agent(s) using any channel. For example, an SRT can be sent over a mobile phone and a response received through the mobile phone. The responses can be sent to agents for peer review in an email. At block 835 peer responses can be received from the agents within the group. These peer responses can indicate an agent's rating of one or more responses or the agent's single choice for the best response. At block 837 the responses can be organized and/or collated.

At block 840 the peer responses can be sent to the group. In some embodiments, the top response as indicated by the collection of peer responses can be sent to the group, for example, the top 3, 4 or 5 peer response can be sent to the group. The responses can be improved, modified and/or updated based on the peer responses by any of the agents in the group. At block 845 the agents can send feedback regarding the peer responses, which can be collated at block 850. An ideal response can be chosen based on the feedback from the agents. For example, the agents can vote on their favorite response or responses, which can then be presented to the group at block 855. Process 800 can end at block 860.

Figure 12:
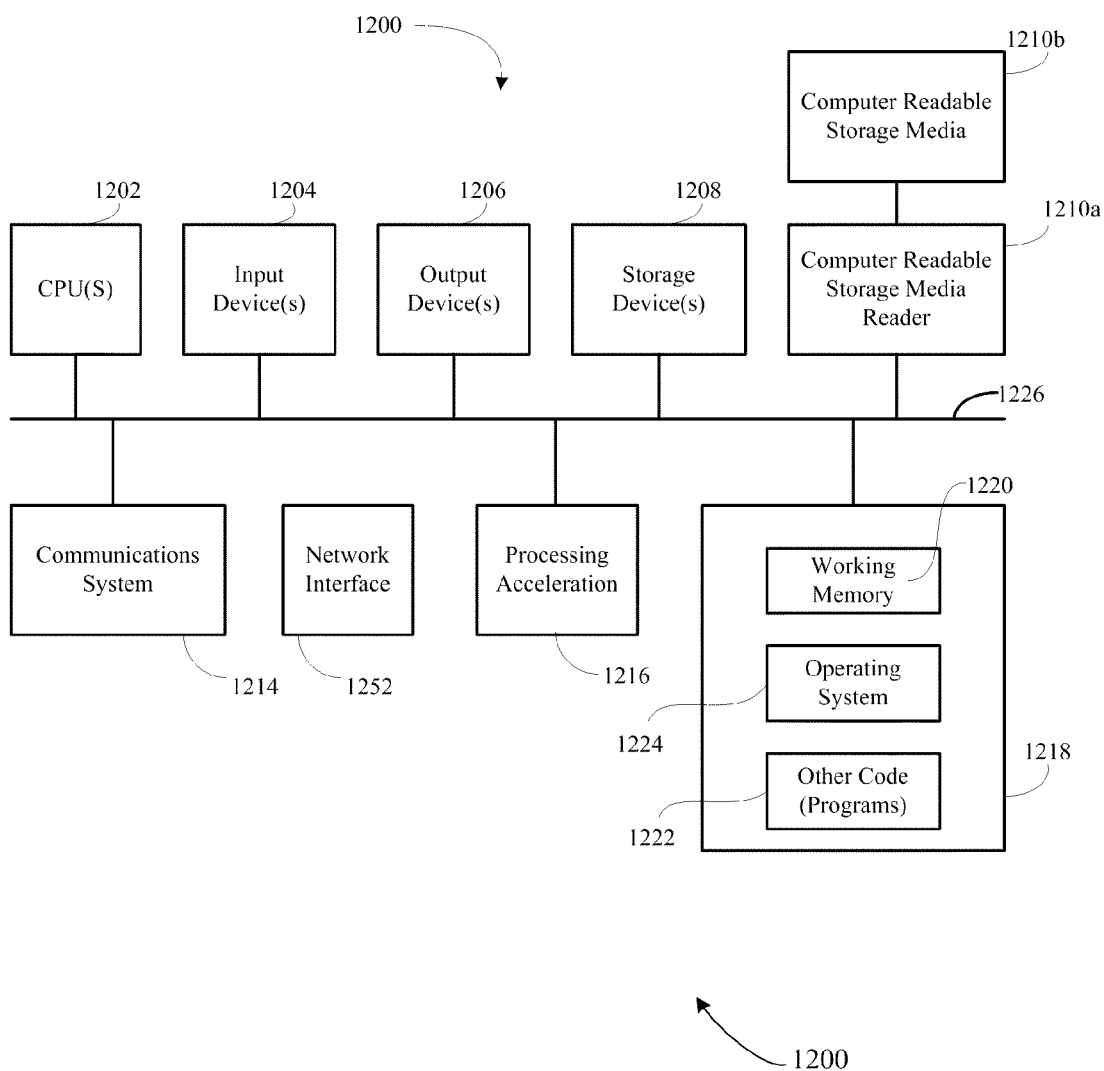
FIG. 12 shows a simplified block diagram of the receiver side of a computer system that can be used to execute various aspects of a situational response training according to some embodiments.

FIG. 12 shows a block diagram of a computer system 1200 that can be used to build and/or execute SRTs as well as auto populate a calendar. Computer system 1200 can be used, for example, for the server 105, web server 135, telephone server 140, agent PC, and/or manger pc 110 shown in FIG. 1. Computer system 1200 can be used to perform any or all the computations shown in FIG. 2 and/or FIG. 3. The drawing illustrates how individual system elements can be implemented in a separated or more integrated manner. The computer 1200 is shown having hardware elements that are electrically coupled via bus 1226. Network interface 1252 can communicatively couple the computational device 1200 with another computer, for example, through a network such as the Internet. The hardware elements can include a processor 1202, an input device 1204, an output device 1206, a storage device 1208, a computer-readable storage media reader 1210a, a communications system 1214, a processing acceleration unit 1216 such as a DSP or special-purpose processor, and memory 1218. The computer-readable storage media reader 1210a can be further connected to a computer-readable storage medium 1210b, the combination comprehensively representing remote, local, fixed, and/or removable storage devices plus storage media for temporarily and/or more permanently containing computer-readable information.

The computer system 1200 also comprises software elements, shown as being currently located within working memory 1220, including an operating system 1224 and other code 1222, such as a program designed to implement methods and/or processes described herein. In some embodiments, other code 1222 can include software that provides instructions for executing various aspects of and SRT. In some embodiments, other code 1222 can include software that can predict or forecast weather events, and/or provide real time weather reporting and/or warnings. It will be apparent to those skilled in the art that substantial variations can be used in accordance with specific requirements. For example, customized hardware might also be used and/or particular elements might be implemented in hardware, software (including portable software, such as applets), or both. Further, connection to other computing devices such as network input/output devices can be employed.

Figure 16:
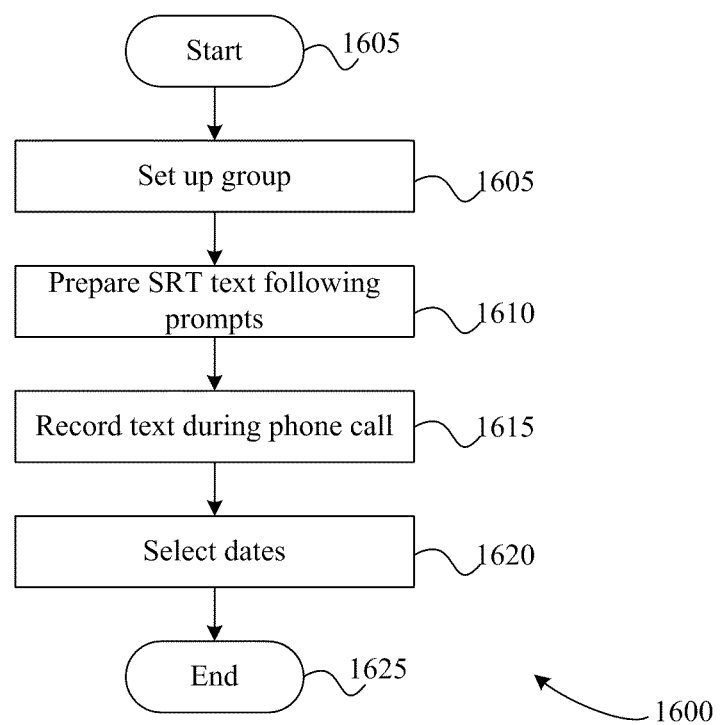
FIG. 16 is a flowchart of a process depicting the creation of an SRT according to some embodiments.

FIG. 16 is a flowchart of process 1600 depicting the creation of an SRT according to some embodiments. Process 1600 begins at block 1605. At block 1610 a user (e.g. a manager) can create a group. A group can include any combination of trainees. For example, a group can include a group of salesmen, a group of managers, a group of directors, and/or a combination thereof. A group can include peers, employees, students, etc. When a group is created various preferences can be included such as contact information, training level, performance level, etc.

Figure 17:
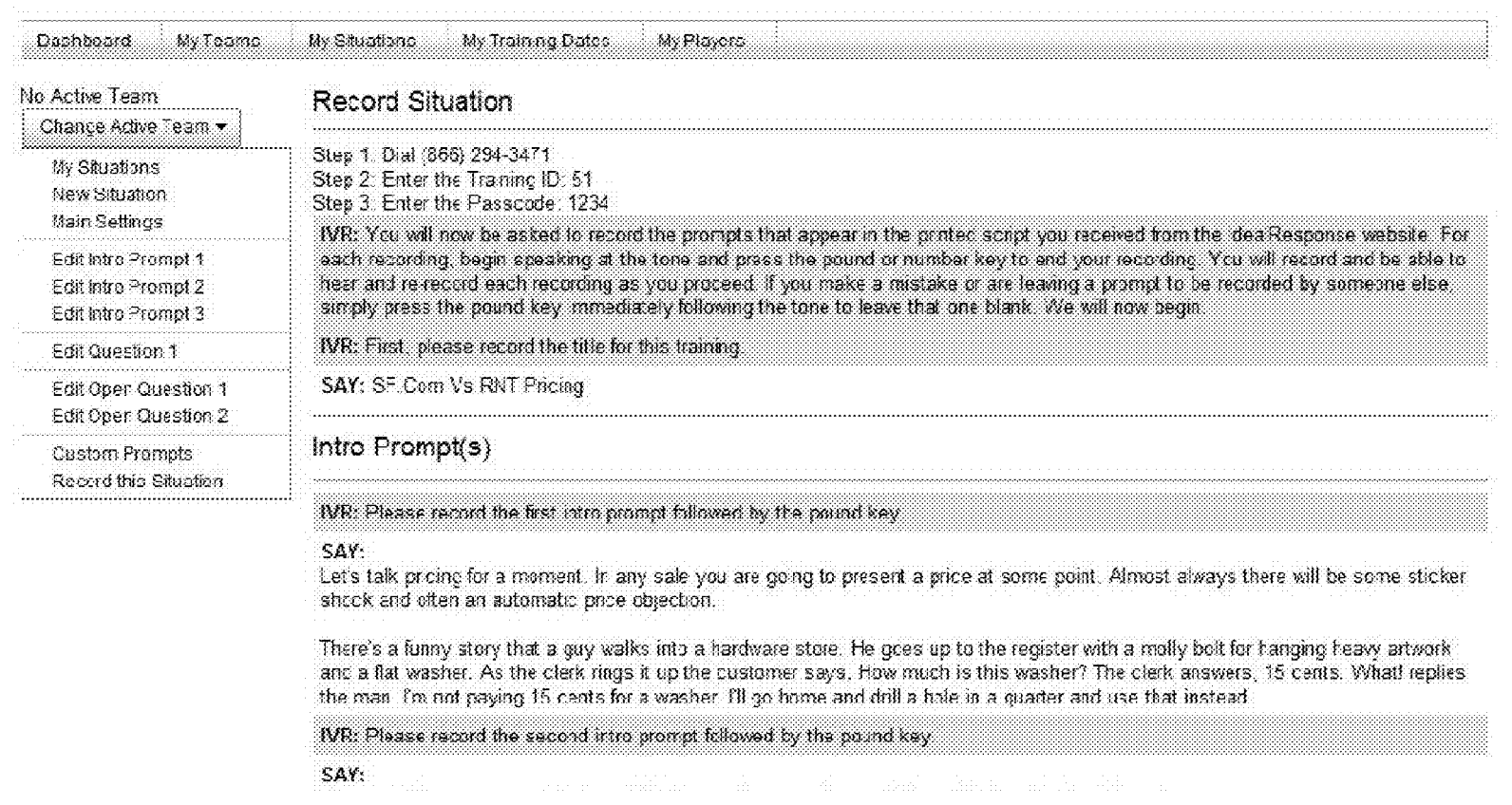

At block 1610 an SRT can be prepared in text. In some embodiments, generic prompts can be presented through a web interface as shown in FIG. 17. The text can include any type of situation, training, or question. For example, the text can be the text of an open ended question and can include a sample answer or other responses. The text can be entered after prompts for an IVR system. As another example, the text can include the text for a multiple choice question as well as the right and wrong answers to the question. The user can select the number of answers in pull down window. Once the text has been entered, the user can indicate completion of the text.

Following completion of the text, the user (e.g. manager) can call a presented phone number and/or receive a phone call that prompts the user to audibly record the text they have just entered at block 1615. The user can simply read the text portions previously entered into the web interface. The phone call can prompt the user to enter various questions and/or answers that were previously entered as text.

Once the text and audio have been entered and recorded, the training dates can be entered at block 1620. For example, the user can enter a date when an introductory email is sent, when an email is sent to ask the user to participate, when the an automated phone call is sent, the end date of the calls as well as the times as shown in FIG. 18. Process 1600 can end at block 1625.

Figure 19:
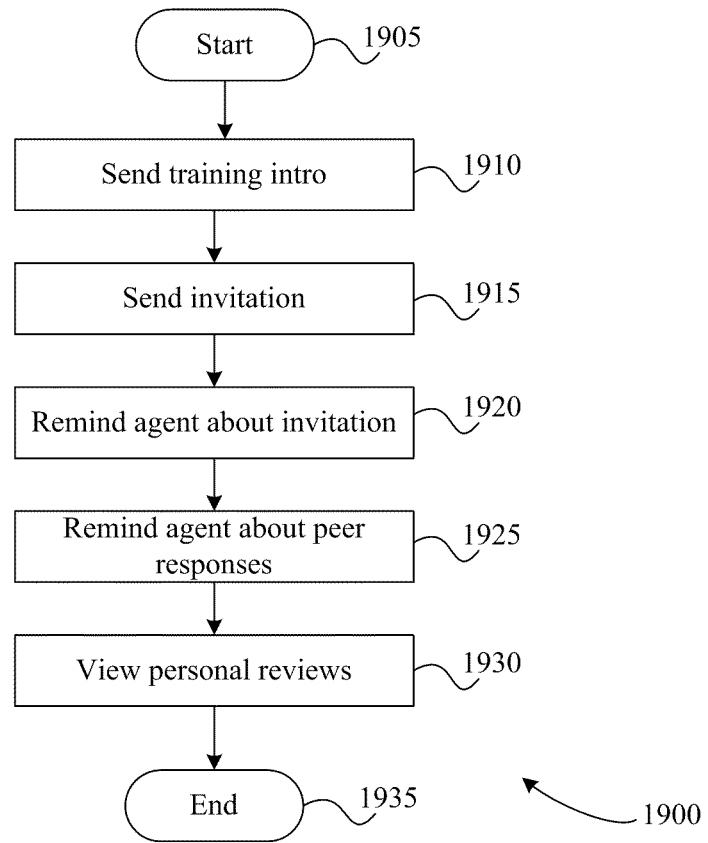
FIG. 19 is a flowchart of an SRT process according to some embodiments.

FIG. 19 is a flowchart of process 1900 for executing an SRT according to some embodiments. Process 1900 begins at block 1905. At block 1910 an SRT that has previously been created by a user and an email (or other message) can be sent to an agent introducing a new training situation. The email can include the training situation, such as, an open ended question, a multiple choice question, etc. For example, the introduction email can be sent on a Friday afternoon, allowing the agent to contemplate the situation over the weekend. The introduction can include a message indicating when the training will occur.

At block 1915 an invitation to participate in a training situation can be sent to an agent. The invitation can include a call in phone number and/or a passcode for participation. In some embodiments, the invitation can alert the agent regarding a time when a phone call will be made instigating the training. In some embodiments, the user can call the phone number or receive the phone call and participate in the SRT. The training, for example, can occur using a phone tree system or an IVR system. In doing so, the user can respond to questions and/or listen to scenarios over the phone. The agent, for example, can also record answers and/or responses over the phone. In some embodiments, the invitation can be sent Monday morning.

At block 1920, if the user has not participated in the training a reminder email can be sent and/or a phone call can be made to the agent at previously determined time intervals requesting the agents participation. At block 1925 an email can be sent to the agent reminding the agent to respond to peer responses. In doing so, the email can include a link to a web page that includes the peer responses. The agent can then rate response by other agents. If the agent likes a particular response, the agent can chose to add the response to a list of favorite responses. At block 1930, an email can be sent to the user indicating that reviews for the agent's response are available for review. The reviews can be performed by peers, managers, experts, etc. A link to a web page can also be included. Process 1900 can end at block 1935.

Figure 9:
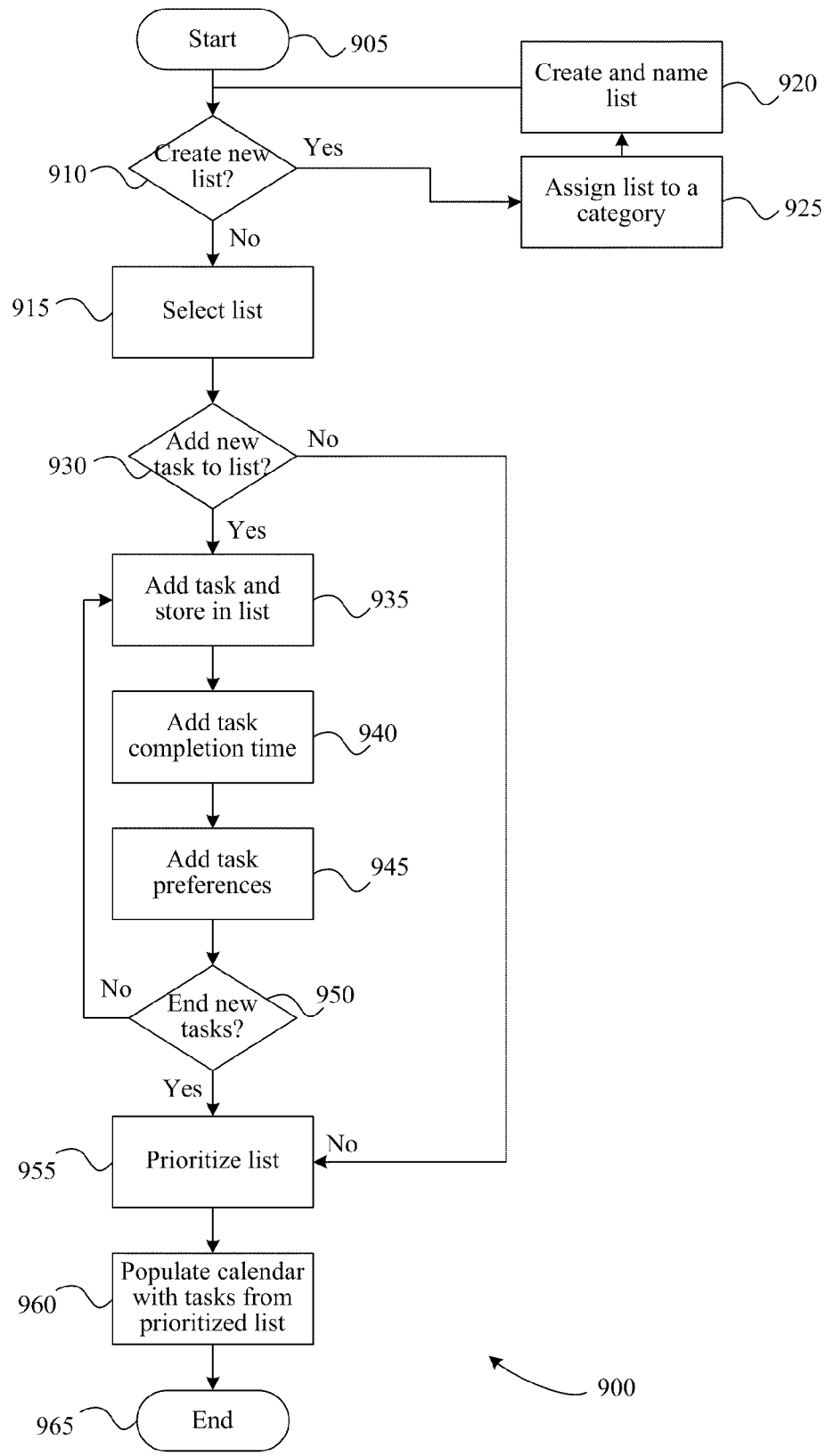
FIG. 9 is a flowchart showing a process for auto populating an electronic calendar according to some embodiments.

FIG. 9 is a flowchart showing process 900 for auto populating an electronic calendar according to some embodiments. Process 900 starts at block 905. At block 910 a user can chose to create a new task list. The list can be created, for example, by assigning the list to a category at block 915 and creating and naming the list 920. The list can be created, for example, by simply adding tasks in a list. The list can be list of text entries or a task list, for example, such as the task list provided in Microsoft® Office Outlook®.

At block 915 a list can be selected. In some embodiments, a number of task lists can be available, from which a single list is selected. At block 930, the user can choose to add a new task to the list. The task can be added to the list and stored in memory at block 935. At block 940 the amount of time estimated to complete the task can be entered and, at block 945, preferences can also be entered. At block 950 it can be determined if more tasks should be entered. If so, process 900 returns to block 935 otherwise process 900 proceeds to block 955. At block 955 the tasks can be prioritized, for example using process 1000 shown in FIG. 10. At block 960 the calendar can be auto populated, for example, using process 1100 shown in FIG. 11.

Figure 10:
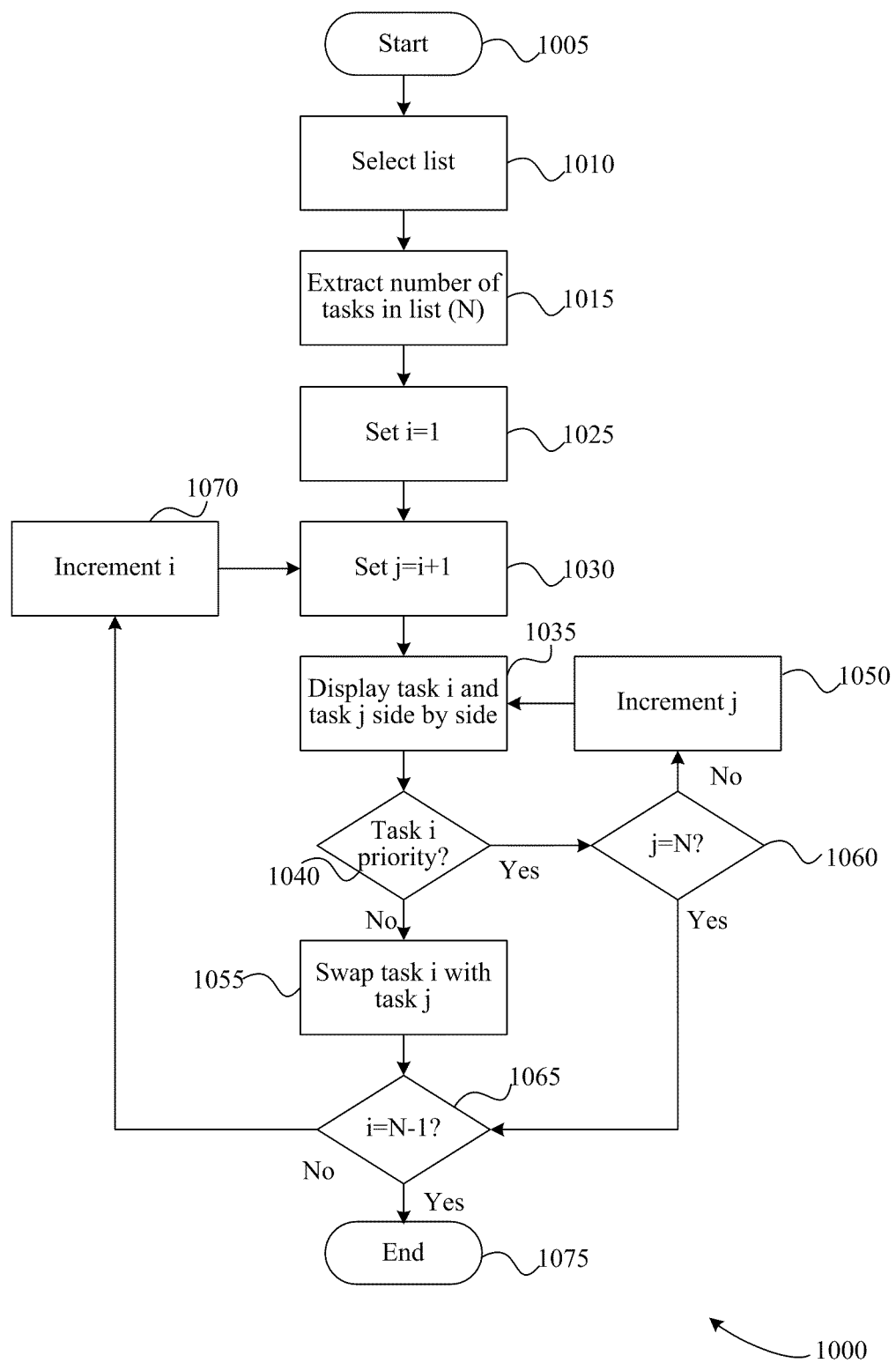
FIG. 10 is a flowchart showing a process for prioritizing a list of elements according to some embodiments.

FIG. 10 is a flowchart showing process 1000 for prioritizing a list of elements according to some embodiments. Process 1000 begins at block 1005. At block 1010 a task list can be selected from a group of tasks lists. At block 1015 the number of tasks (N) in the list can be extracted. At block 1025 pointer i can be set to 1. At block 1030 pointer j can be set to i+1.

At block 1035 task i and task j can be displayed side by side on a computer display and the user can determine whether task i is a higher priority than task j block 1040. If task i is a higher priority than task j, then process it determined whether pointer j equals N. If not, j is incremented at block 1050 and process returns to block 1035, otherwise process 1000 proceeds to block 1065. If, however, task j is a higher priority than task i as determined at block 1040, then task i and task j are swapped in the list at block 1055.

At block 1065, if i equals one less than the length of the task list then process 1000 ends at block 1075 with a prioritized task list, otherwise process 1000 proceeds to block 1070 where pointer i is incremented. Process 1000 then returns to block 1030.

Figure 11:
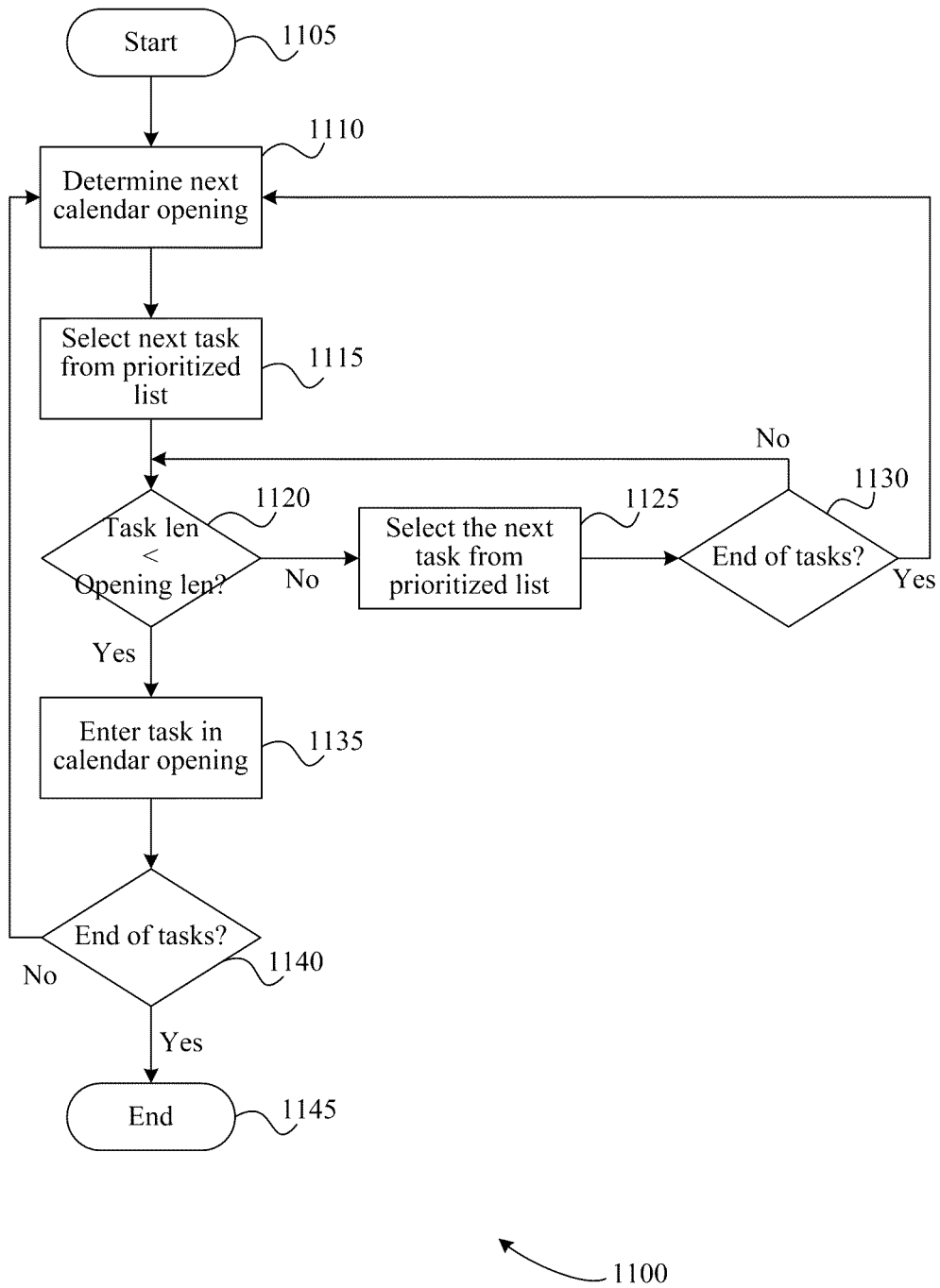
FIG. 11 is a flowchart showing a process for auto populating a calendar with tasks in a prioritized task list according to some embodiments.

FIG. 11 is a flowchart showing process 1100 for auto populating a calendar with tasks in a prioritized task list according to some embodiments. Process 1100 starts at block 1105. At block 1110 the next calendar opening in an electronic calendar can be determined. The length of the calendar opening can also be determined. At block 1115 the next task in a prioritized task list can be selected. If the task length is less than the calendar opening length, as determined at block 1120, then process 1100 proceeds to block 1135, otherwise process 1100 proceeds to block 1125.

At block 1125 the next task in the prioritized task list can be selected. At block 1130 it can be determine if the end of the task list has been reached. If not, then process 1100 proceeds to block 1120, otherwise process 1100 moves to block 1110 and the next calendar opening is selected. At block 1135, the task can be entered into the calendar at the beginning of the calendar opening time and spanning the task length time. At block 1140 if more tasks are available in the task list that have not been entered into the calendar, then process 1100 returns to block 1110, otherwise process 1100 ends at block 1145.

Figure 20:
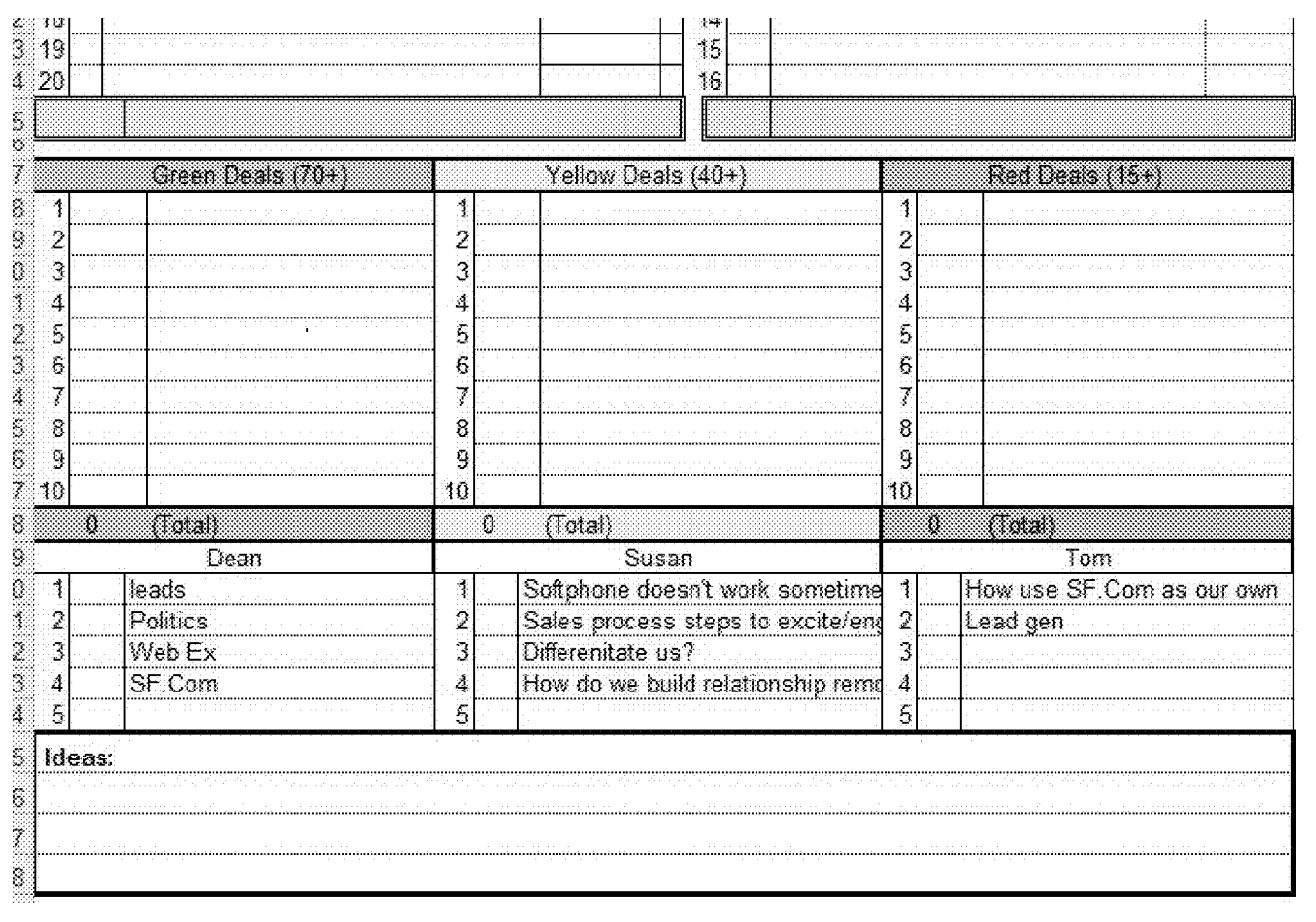
Figure 22:
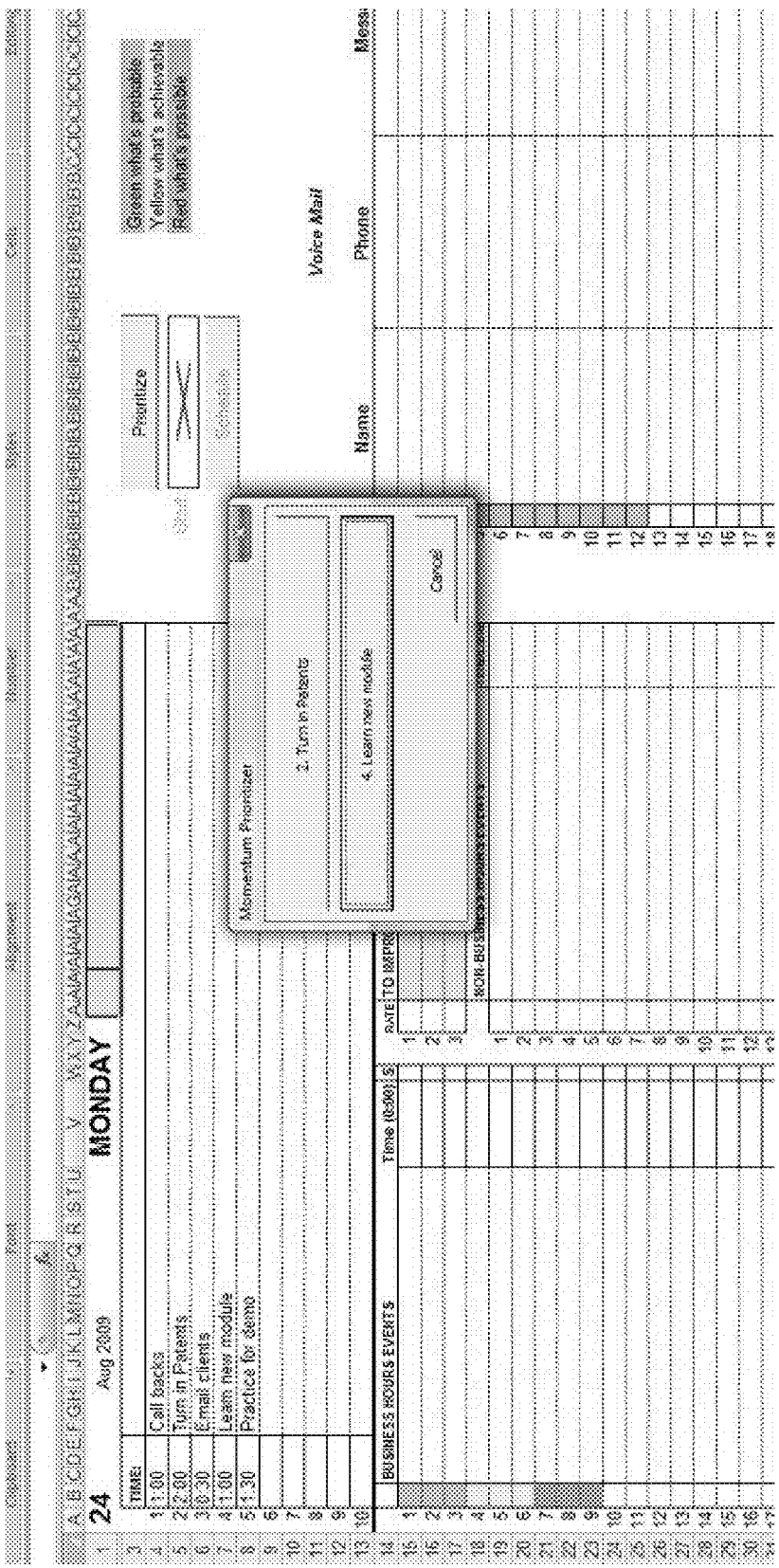

FIGS. 20-22 are screen shots of embodiments of the invention. Too many times we let others plan our day. We fill it with things that aren't getting us where we need to go. This is a simple way to compare each activity listed. In some embodiments, the process can include:

1-List each activity
2-Add a time element (how long will it take)
3-Press the button to prioritize the list
4-Each item is compared with the next on the list until all have been compared
5-The item with the highest priority is selected. A tie is determined by the one selected in the comparison
6-The prioritized list is then shown with total time to accomplish during the day.
7-Then the schedule button is pushed.
8-The prioritized list is sent to a calendar program such as outlook to fill in gaps available.
9-This allows you to focus on the most important priorities first and see how far you can accomplish in the time allotted.

Specific details are given in the above description to provide a thorough understanding of the embodiments. However, it is understood that the embodiments may be practiced without these specific details. For example, circuits, structures, and/or components may be shown in block diagrams in order not to obscure the embodiments in unnecessary detail. In other instances, well-known circuits, processes, algorithms, structures, components, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

While the principles of the disclosure have been described above in connection with specific apparatuses and methods this description is made only by way of example and not as limitation on the scope of the disclosure.

What is claimed is:

1. A method comprising:
receiving a training situation from a manager that is directed toward members of a specified group, wherein the manager is not a member of the specified group;
providing an interface to each member of the specified group within which each member of the specified group can respond to the training situation;
receiving a plurality of responses to the training situation through the interface from at least a subset of the members of the specified group;
collating the plurality of responses to the training situation, wherein the collating includes consolidating the responses to the training situation received through at least two communication channels selected from the group consisting of a telephone channel, an email channel, a text message channel, a chat channel, an audio channel, a sounding board channel, a video channel, a cyberspace channel, a peer channel, an avatar channel, a story board channel, and an application channel;
providing the collated responses received from the subset of the members of the specified group to all of the members of the specified group;
receiving a plurality of ratings on a plurality of the responses from at least a plurality of the members of the specified group through the interface;
receiving a plurality of comments on a plurality of the responses from at least a plurality of the members of the specified group through the interface; and
providing the plurality of ratings and the plurality of comments to each member of the specified group through the interface.

2. The method according to claim 1, wherein the interface includes a web interface.

3. The method according to claim 1, wherein the interface includes an interactive voice response system.

4. The method according to claim 1, wherein the interface is a smart phone.

5. The method according to claim 1, wherein the response to the training situation comprises a video.

6. The method according to claim 1, wherein the response to the training situation comprises an audio recording.

7. The method according to claim 1, wherein the response to the training situation comprises text.

8. The method according to claim 1, further comprising collating the ratings received from the members of the group prior to providing the ratings.

* * * * *